United States Patent [19]

Kimball

[11] 4,017,464
[45] Apr. 12, 1977

[54] POLYTETRAMETHYLENE ETHER URETHANE CURED WITH 2,2'-DIAMINODIPHENYL DISULPHIDE

[75] Inventor: Michael E. Kimball, Norton, Ohio
[73] Assignee: The Goodyear Tire & Rubber Company, Akron, Ohio
[22] Filed: Feb. 5, 1976
[21] Appl. No.: 655,325
[52] U.S. Cl. .............. 260/77.5 AM; 260/77.5 AQ; 260/77.5 AT
[51] Int. Cl.² ........................ C08G 18/10
[58] Field of Search ........... 260/77.5 AM; 77.5 AT, 260/77.5 AQ

[56] References Cited
UNITED STATES PATENTS 3,036,996  5/1962  Kogon ............. 260/77.5 AM
3,926,919  12/1975  Finelli ............. 260/77.5 AM

*Primary Examiner*—Eugene C. Rzucidlo
*Attorney, Agent, or Firm*—F. W. Brunner; J. D. Wolfe

[57] ABSTRACT

Polytetramethylene ether urethane having improved physical properties is produced by reacting polytetramethylene ether polyol with a toluene diisocyanate containing at least 50 percent 2,4 isomer, reacting at a temperature no greater than about 40° C. to produce a prepolymer and curing the prepolymer with 2,2'-dithio dianiline having the formula

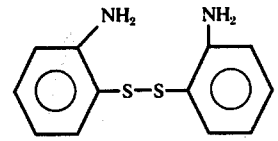

at a temperature of 105° C.

2 Claims, No Drawings

POLYTETRAMETHYLENE ETHER URETHANE CURED WITH 2,2'-DIAMINODIPHENYL DISULPHIDE

This invention relates to a method of making an improved polyurethane using isomeric mixtures of toluene diisocyanate having a high percentage of the 2,4-isomer utilizing polytetramethylene ether polyols and 2,2'-dithiodianiline having the formula

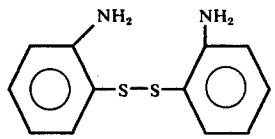

and to said improved polyurethane.

Toluene diisocyanate and its isomeric mixtures have long been used in making polyurethane. Likewise, polytetramethylene ether glycol has been utilized as a reactant for producing prepolymers, such as the Adiprenes made by E. I. duPont deNemours & Company, and then these prepolymers have been cured with polyols or polyamines. For the more severe usages the polyurethanes made using toluene diisocyanate and polytetramethylene ether glycols have not been satisfactory and consequently the industry has utilized the more expensive diisocyanates such as tolidine diisocyanate to obtain polyurethanes having improved physicals relative to melting points, modulus and related physical properties. Because of this defect in the toluene diisocyanate produced polyurethane, the polyurethanes utilizing the more expensive diisocyanate have placed an economic block on the utilization of polyurethanes for some purposes.

Therefore it is an object of this invention to provide a method of making polyurethanes utilizing toluene diisocyanate containing a high percentage of the 2,4 isomer, polytetramethylene ether polyol to produce a prepolymer which can be cured with 2,2'-dithiodianiline (bis 2) to produce a polyurethane having physicals at least 10 to 25 percent better than those heretofore obtained with these materials using bis-2 as the curative.

This object and other advantages may be achieved by reacting toluene diisocyanate containing at least 50 percent of the 2,4 isomer with the polytetramethylene ether glycol or triol having a molecular weight average of at least 1000 to 4000 at a temperature no higher than 40° C. to produce the prepolymer and then curing the prepolymer with 2,2'-dithiodianiline at a temperature no higher than 105° C. Polyurethanes made in accordance with this procedure have unusual physical properties in that the crescent tear is appreciably higher and the tensile properties are higher than those obtained when the prepolymer is made at temperatures of 90° C. and higher and the prepolymer is cured at temperatures greater than 120° C.

The nature of this invention more readily may be appreciated by reference to the illustrative examples wherein all parts are by weight unless otherwise indicated. Four hundred and fifty parts of polytetramethylene ether glycol of 2000 molecular weight and 300 parts of a polytetramethylene ether glycol of 3000 molecular weight were blended together, degassed under vacuum at elevated temperature and allowed to cool to 40° C. at which time 136.1 parts of 2,4-toluene diisocyanate were added to the reactor and the temperature maintained at 40° C. for 6 hours. This prepolymer contained 4.38 percent free NCO and was reacted with 2,2'-dithiodianiline at an amine level of 0.8 at a temperature no higher than 80° C. and the resulting polyurethane was cast into a mold for test strips and allowed to cure at 105° C. temperature for 16 hours. A control polyurethane was made utilizing the same recipe except the prepolymer was made at 90° C. and the amine was added at 80° C. and heated for 16 hours at 105° after the test strips had been poured. Physical properties of the test strips were determined and the physical properties of these test strips are set forth in Table 1.

Table 1

| Comparison of physical properties of TDI prepolymers Temp. of Resin at NCO addition | | 40° C. | 90° C. |
| --- | --- | --- | --- |
| Percent NCO found, in prepolymer | | 4.38 | 3.97 |
| Modulus | 100 | 430 | 330 |
| lb/in$^2$ | 300 | 790 | 615 |
|  | 500 | 4000 | 3600 |
| Ult. Tensile, psi | | 5420 | 4000 |
| Elong., % | | 520 | 510 |
| Crescent Tear | | 273 | 222 |
| 25% Comp. Set | 158° F. | 31 | 28 |
|  | RT | 8 | 7 |
| Comp. Load Defl., | 10% | 160 | 100 |
|  | 20% | 300 | 220 |
|  | 30% | 500 | 380 |
|  | 40% | 840 | 620 |

This difference in physical properties achieved by reaction with toluene diisocyanate containing at least 50 percent 2,4 isomer with the polytetramethylene ether polyol at the lower temperature is unexpected and unobvious as the higher temperatures are normally thought to produce the best cures and physical properties.

Thus, the polyurethanes made with toluene diisocyanate containing 50 percent 2,4 isomer, polytetramethylene polyol and cured with about 0.8 to 0.95 mol percent of bis-2 at the low temperatures of this invention are better for tank tracks, cast pneumatic tires and other molded or fabricated parts where good to excellent abrasion resistance and low heat buildup in the elastomer is desired.

For instance, solid tires were prepared with 65 percent, 2,4/35 percent, 2,6 isomeric toluene diisocyanate, polytetramethylene ether glycol of 2300 average molecular weight and cured with 2,2'-dithiodianiline at low temperatures and high temperatures and ran on the resiliometer test. The solid tire prepared where prepolymer preparation temperature was 40° C., cure temperature was 80° C. and 16 hour postcure was at 105° C., ran 53 hours, whereas the one prepared at 90° C. prepolymer temperature, a cure temperature of 80° C. and 16 hour postcure temperature of 105° C. ran only 30 hours. It is indeed unexpected to find the temperature of prepolymer preparation and at least 50 percent 2,4 isomer in toluene diisocyanate can effect the service line to such a vast degree.

While certain representative embodiments and details have been shown for the purpose of illustrating the invention, it will be apparent to those skilled in this art that various changes and modifications may be made therein without departing from the spirit or scope of the invention.

What is claimed is:

1. A polytetramethylene ether polyol urethane prepared by reacting a mol of a polytetramethylene ether polyol having 2 to 3 hydroxyls and an average molecular weight of 1000 to 4000 with 1.6 to 4 mols of toluene diisocyanate containing at least 50 percent by weight of the 2,4 isomer at a temperature from ambient to 40° C. to form a prepolymer and curing said prepolymer at a temperature no higher than 150° C. with 0.8 to 0.95 mol percent of 2,2'-dithiodianiline.

2. The urethane of claim 1 wherein the polytetramethylene ether polyol has 2 hydroxyls.

* * * * *